(12) United States Patent
Jiang

(10) Patent No.: US 8,000,530 B2
(45) Date of Patent: Aug. 16, 2011

(54) COMPUTER-IMPLEMENTED EXPERT SYSTEM-BASED METHOD AND SYSTEM FOR DOCUMENT RECOGNITION AND CONTENT UNDERSTANDING

(76) Inventor: Hubin Jiang, Great Falls, VA (US)

(*) Notice: Subject to any disclaimer, the term of this patent is extended or adjusted under 35 U.S.C. 154(b) by 996 days.

(21) Appl. No.: 11/553,375

(22) Filed: Oct. 26, 2006

(65) Prior Publication Data

US 2008/0112620 A1    May 15, 2008

(51) Int. Cl.
*G06K 9/00* (2006.01)
(52) U.S. Cl. .......................... 382/181; 382/155; 382/224
(58) Field of Classification Search .................. 382/181, 382/231, 135, 137, 138, 139, 140, 155, 161
See application file for complete search history.

(56) References Cited

U.S. PATENT DOCUMENTS

| 6,044,375 A | 3/2000 | Shmueli et al. |
| 2006/0072830 A1* | 4/2006 | Nagarajan et al. ............. 382/224 |
| 2006/0190489 A1 | 8/2006 | Vohariwatt et al. |
| 2006/0230004 A1* | 10/2006 | Handley .......................... 706/12 |
| 2008/0005137 A1* | 1/2008 | Surendran et al. ............ 707/101 |

* cited by examiner

*Primary Examiner* — Brian Q Le
*Assistant Examiner* — Edward Park
(74) *Attorney, Agent, or Firm* — Roberts Mlotkowski Safran & Cole P.C.

(57) ABSTRACT

A system and process for recognizing documents by type and understanding at least a portion of the contents thereof. The process includes the steps of providing a document in electronic form, determining a set of facts, data and information about the document, providing the set of facts, data and information to a reasoning management unit, receiving formatted knowledge from a rule verification, validation and management unit, using the formatted knowledge to prepare an expert system having an inference engine, matching the facts, data and information against formatted knowledge using the inference engine and determining a set of applicable rules and executing actions of applicable rules.

24 Claims, 4 Drawing Sheets

System Overview

Figure 1 System Overview

Fig. 2 Example of Logic Language and Graphics User Interface – Set up Rules

Fig. 3 Example of Logic Language and Graphics User Interface – Set up Relationships Between Rules

COMPUTER-IMPLEMENTED EXPERT SYSTEM-BASED METHOD AND SYSTEM FOR DOCUMENT RECOGNITION AND CONTENT UNDERSTANDING

FIELD OF THE INVENTION

The present invention relates generally to document recognition and the understanding of the contents of electronic documents.

BACKGROUND OF THE INVENTION

Information and data processing is required in virtually all areas of human endeavor. The shear volume of documents that an organization must contend with has become increasingly problematic. The ability to rapidly obtain relevant documents from the huge store of available documents has become a key to an organization's success. Electronic document handling is the foundation for the future of information processing, with millions upon millions of papers being converted into electronic images every day.

Electronic documents such as images, emails, reports, web pages, etc. are generated at a tremendous rate. Indexing and classifying these electronic documents into manageable databases has become a mandatory task, without which, retrieval and searching for information and data among such documents is impossible in terms of efficiency and accuracy. As is well known, the cost of classifying documents manually is extremely high. As the number of documents being digitally captured and distributed in electronic format increases, there is a growing need for techniques and systems to quickly classify digitally captured documents.

At one time document classification was done manually. An operator would visually scan and sort documents by document type. This process was tedious, time consuming, and expensive. As computers have become more ubiquitous, the quantity of new documents including on-line publications has increased greatly and the number of electronic document databases has grown almost as quickly. As the number of documents being digitally captured and distributed in electronic format increases, the old, manual methods of classifying documents are simply no longer practical. Similarly, the conversion of information in paper documents is an inefficient process that often involves data entry operators transcribing directly from original documents to create keyed data.

A great deal of effort in the area of document handling and analysis has been done in the areas of document management systems and document recognition. Specifically, the areas of page decomposition and optical character recognition (OCR) are well developed in the art. Page decomposition involves automatically recognizing the organization of an electronic document. This usually includes determining the size, location, and organization of distinct portions of an electronic document. For example, a particular page of an electronic document may include data of various types including paragraphs of text, graphics, and spreadsheet data. The page decomposition would typically be able to automatically determine the size and location of each particular portion, as well as the type of data found in each portion. Certain page decomposition software go further than merely determining the type of data found in each portion, and will also determine format information within each portion. For example, the font, font size, and justification may be determined for a block containing text.

As may be appreciated, OCR involves converting a digital image of textual information into a form that can be processed as textual information. Since electronically captured documents are often simply optically scanned digital images of paper documents, page decomposition and OCR are often used together to gather information about the digital image and sometimes to create an electronic document that is easy to edit and manipulate with commonly available word processing and document publishing software. In addition, the textual information collected from the image through OCR is often used to allow documents to be searched based on their textual content.

In today's information society, individuals often require information and data acquired by others relating to them, making the freedom and ability to obtain such information a necessity. Organizations, both commercial and governmental, are required to provide such information upon request. However, documents so provided cannot contain confidential and/or otherwise secret information and data. As such, redaction is required before certain documents can be sent out. As may be appreciated, the redaction process is extremely costly, both in time and money, if performed manually. Finally, data capturing (data entry and coding) has become very important. In many situations, data must be captured and populated into databases for data mining, searching, and processing. When performed manually, these tasks are extremely costly.

There have also been a number of systems proposed that deal with classifying and extracting data from multiple document types. There are also systems available for automatically recognizing a candidate form as an instance of a specific form contained within a forms database based on the structure of lines on the form. These systems rely, however, on the fixed structure and scale of the documents involved.

Additionally, expert systems have been proposed using machine learning techniques to classify and extract data from diverse electronic documents. One such expert system proposed is described in U.S. Pat. No. 6,044,375, entitled "Automatic Extraction of Metadata Using a Neural Network." Since machine learning techniques generally require a training phase that demands a large amount of computational power, such classification systems operate more efficiently if the document type of a new document is known.

From the foregoing it will be apparent that there is still a need for an improved system and process for document recognition that is capable of understanding the contents of electronic documents.

SUMMARY OF THE INVENTION

In one aspect, provided is a process for recognizing documents by type and understanding at least a portion of the contents thereof. The process includes the steps of providing a document in electronic form, determining a set of facts, data and information about the document, providing the set of facts, data and information to a reasoning management unit, receiving formatted knowledge from a rule verification, validation and management unit, using the formatted knowledge to prepare an expert system having an inference engine, matching the facts, data and information against formatted knowledge using the inference engine and determining a set of applicable rules and executing actions of applicable rules.

In another aspect, provided is a system for recognizing a document type and understanding at least a portion of the contents thereof. The system includes an electronic file management unit for providing a document in electronic form, a facts generator for determining a set of facts, data and information about the document, a reasoning management unit for receiving the set of facts, data and information from the facts generator, a rule verification, validation and management unit for receiving formatted knowledge, and an expert system having an inference engine for matching the facts, data and information against the formatted knowledge using the inference engine and determining a set of applicable rules and executing actions of applicable rules.

In yet another aspect, the rule verification, validation and management unit determines whether conflicting rules exist, determines whether conflicting facts exist, determines whether cyclic data locks, recursive loops and indefinite execution of rules are present, sorts rules into groups and managing the groups so arranged, manages the knowledge base and assembles the rules into a format useful for the expert system.

In a further aspect, the set of facts, data and information is generating through the use of at least one tool selected from the group consisting of a pattern generator, an optical character recognition program, an intelligent character recognition program, and a natural handwriting recognition program.

In a still further aspect, a system is provided to understand the contents of electronic documents. The system can be trained with document characteristics and content information, and captures knowledge about a document. Such knowledge is refined through the use of human-machine interfacing with the system. Therefore, when electronic documents are presented to the system, the system will use the knowledge learned and perform automatically such functions as document classification/sorting, document redaction, and data/information extraction.

The system disclosed herein possesses the capability of understanding the contents of an electronic document and therefore provides an automated solution to problems such as document classification, information redaction, information capturing, and data extraction.

The system disclosed herein utilizes a logic language and machine reasoning, rather than traditional pattern recognition methodology. As such, it overcomes the fundamental drawback of traditional pattern recognition methodology, wherein patterns for unstructured document can be impossible to define. The system disclosed herein not only understands structured documents, but understands unstructured documents at a high accuracy level. The system disclosed herein is also capable of working in a pattern recognition environment. As may be appreciated, the system will function satisfactorily with a language other than a logic language when a corresponding language interpretation interface is employed.

These and other features are described herein with specificity so as to make the present invention understandable to one of ordinary skill in the art.

BRIEF DESCRIPTION OF THE DRAWINGS

The invention is further explained in the description that follows with reference to the drawings illustrating, by way of non-limiting examples, various embodiments of the invention wherein.

DETAILED DESCRIPTION OF THE INVENTION

Disclosed herein is a system and process for recognizing documents by type and understanding at least a portion of the contents thereof, each now described in specific terms sufficient to teach one of skill in the practice thereof. In the description that follows, numerous specific details are set forth by way of example for the purposes of explanation and in furtherance of teaching one of skill in the art to practice the invention. It will, however, be understood that the invention is not limited to the specific embodiments disclosed and discussed herein and that the invention can be practiced without such specific details and/or substitutes therefor. The present invention is limited only by the appended claims and may include various other embodiments which are not particularly described herein but which remain within the scope and spirit of the present invention.

The logic language is defined using IF-THEN clauses with facts and goals connected by AND/OR (AND or OR) logic as illustrated below:

IF Fact 1 AND/OR Fact 2 AND/OR [...] THEN Goal 1 AND/OR Goal2 AND/OR [...];
    where [...] defines more Facts and Goals with AND or OR relationships.

As may be appreciated, one IF-THEN clause corresponds to one rule. While a set of rules corresponds to knowledge, a set of rules may consist of only one rule. The knowledge describes the characteristics of a document.

A Fact consists of a definition, information, and data about something to be described, such as an area, a string statement, a local characteristic in an area, etc. The definition defines what is looked for, such as, for example, but not by way of limitation, a statement, characters, a picture, a color, a pattern, etc. The information provides a description of where and what or when such as, for example, but not by way of limitation, an area, a segmentation, etc. The data describes what kind of actual item is sought to provide the information. A Fact is TRUE if a fact instance matches the Fact's definition, information, and data. Otherwise, the Fact is FALSE.

A Goal consists also of a definition, information, and data. However, the definition, information, and data describe a result. Of course, as may be appreciated by those skilled in the art, a Goal could be used as a Fact to other rule(s).

The Facts and Goals are the foundation of characteristics and content understanding of a document.

In this invention, the logic language is used, in a sense, to paraphrase human knowledge how a document is characterized and understood. However, as may be appreciated, the system will function satisfactorily with a language other than a logic language when a corresponding language interpretation interface is employed. Such other forms remain within the scope and spirit of the present invention.

Figure 1:
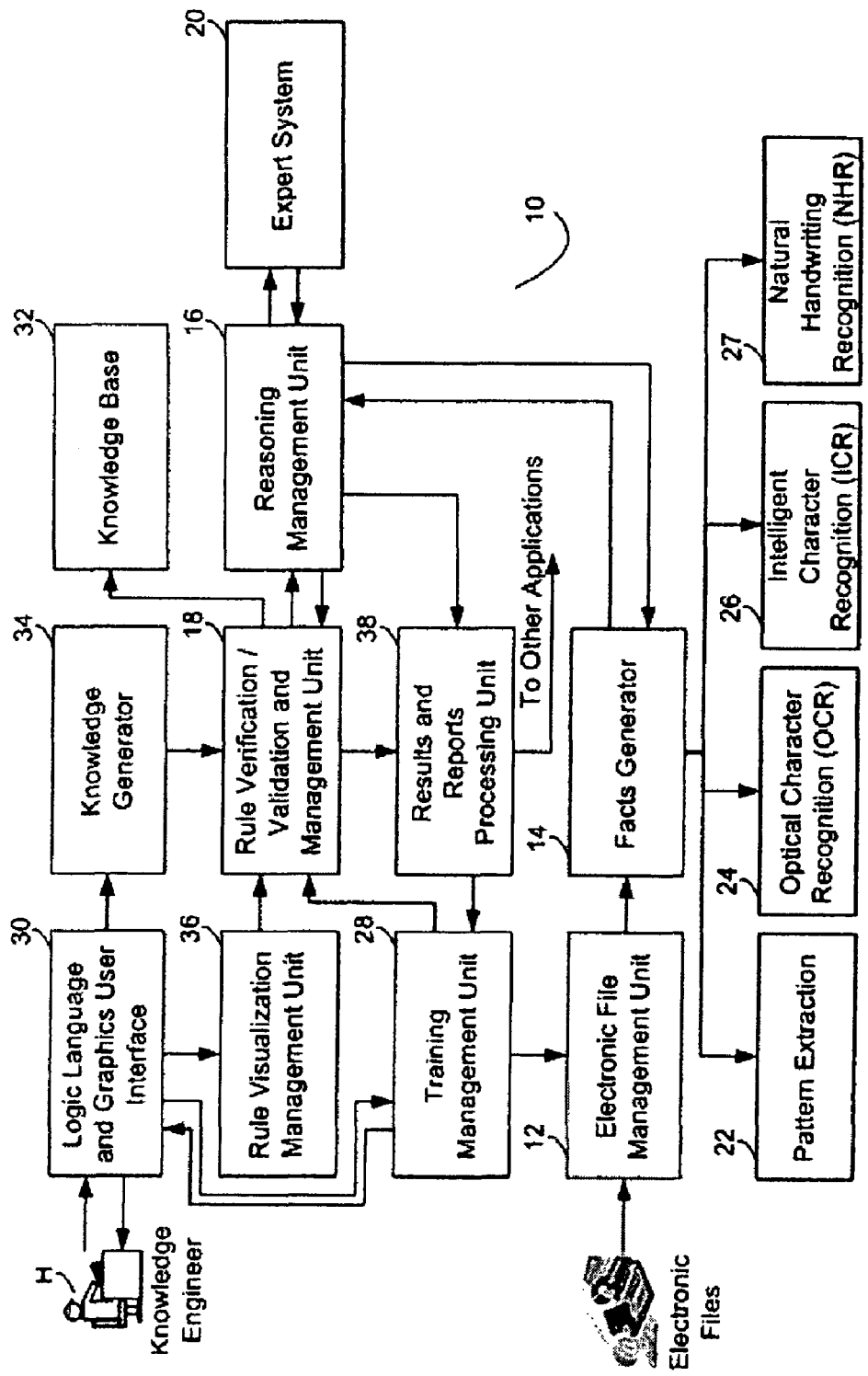
FIG. 1 is a schematic overview of a system for recognizing documents by type and understanding at least a portion of the contents thereof, according to the present invention.

Referring now to FIG. 1, a system for recognizing a document type and understanding at least a portion of the contents thereof 10, is presented. As shown, system 10 includes an electronic file management unit 12 for providing a document in electronic form for further processing by system 10. System 10 also includes a facts generator 14 for determining a set of facts about the document and a reasoning management unit 16 for receiving the set of facts from facts generator 14. A rule verification, validation and management unit 18 for receiving formatted knowledge is also provided, which interfaces with reasoning management unit 16 and other modules of system 10, as will be described in more detail herein below.

An expert system 20 is also provided, expert system 20 having an inference engine for matching and reasoning the facts determined by facts generator 14 against the formatted knowledge using the inference engine and determining a set of applicable rules and executing actions of applicable rules. Facts generator 14 generates the set of facts through the use of at least one tool selected from the group consisting of a pattern generator 22, an optical character recognition program 24 an intelligent character recognition program 26, and a natural handwriting recognition program 27.

In operation, when a document type is successfully determined, the reasoning management unit 16 is provided with information concerning the understanding of at least a portion of the document content. In cases where the reasoning management unit 16 is not initially provided with information concerning the understanding of at least a portion of the document content, the document is sent to training management unit 28 for further processing. Advantageously, the training management unit 28 of system 10 enables the system 10 to obtain knowledge from a human expert H through the use of logic language and graphics user interface 30 and to perform document content understanding and analysis as trained by human expert H. System 10 can be retrained and refined so that it possesses additional knowledge, as required. As will be appreciated, the system 10 can be modified by adding self learning capabilities.

Logic language and graphics user interface 30 provides tools and mechanisms for a human expert H to teach system 10 about the characteristics and goals of content understanding. The relevant characteristics are used to identify a document page or a document. For example, a specific medical form, a specific legal document, a specific loan application can be so identified. The goals of content understanding are to accomplish that which should be known or understood. For example, a person's address or social security number, the day admitted into a hospital, or whatever the document is related to, should be identified and understood.

In operation, logic language and graphics user interface 30 asks training management unit 28 for a new document. A new document is provided either from the group of documents that have been processed but not yet understood (e.g.: not previously trained) or from electronic file management unit 12, where a document is assumed to be new. In either case, training management unit 28 will ask rule verification, validation and management unit 18 to verify whether or not the new document is indeed new. Rule verification, validation and management unit 18 in turn will check knowledge base 32 to ensure the status of the document. With a new document, human expert H will set up the characteristics and goals by using logic language and graphics user interface 30.

After the characteristics and goals are established, the knowledge generator 34 will organize them into rules with supporting information and requirements (knowledge) and provides the knowledge to rule verification, validation and management unit 18 for verification and validation before saving the knowledge to knowledge base 32.

In operation, among the tasks performed by rule verification, validation and management unit 18 are the validation of new rules, checking the knowledge base 32, management of knowledge base 32, and other tasks. Additionally, rule verification, validation and management unit 18 detects conflicting rules, detects conflicting facts and identifies cyclic data locks, recursive loops and the indefinite execution of rules. Rule verification, validation and management unit 18 also sorts rules into groups and manages the groups and rules and performs management functions on knowledge base 32 such as adding rules, deleting rules, managing knowledge per project, maintaining rules and knowledge base 32. Rule verification, validation and management unit 18 also retries rules from knowledge base 32 and assembles the rules into a format that expert system 20 can understand, passes the formatted rules to reasoning management unit 16 and, in turn, passes the formatted rules in the expert system 20 for execution.

Figure 2:
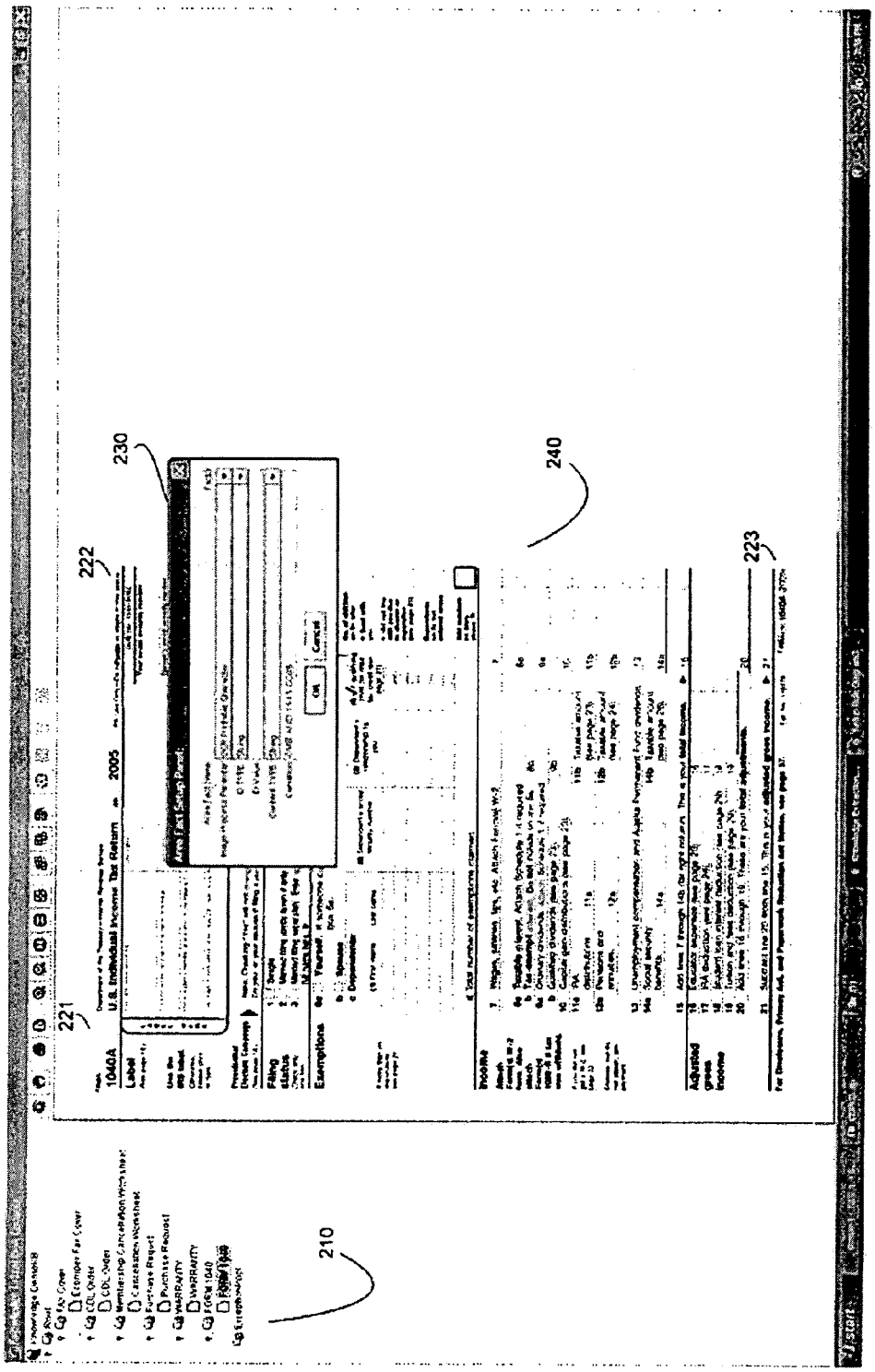
FIG. 2 is an example of a Logic Language and Graphics User Interface, with corresponding set-up rules.
Figure 3:
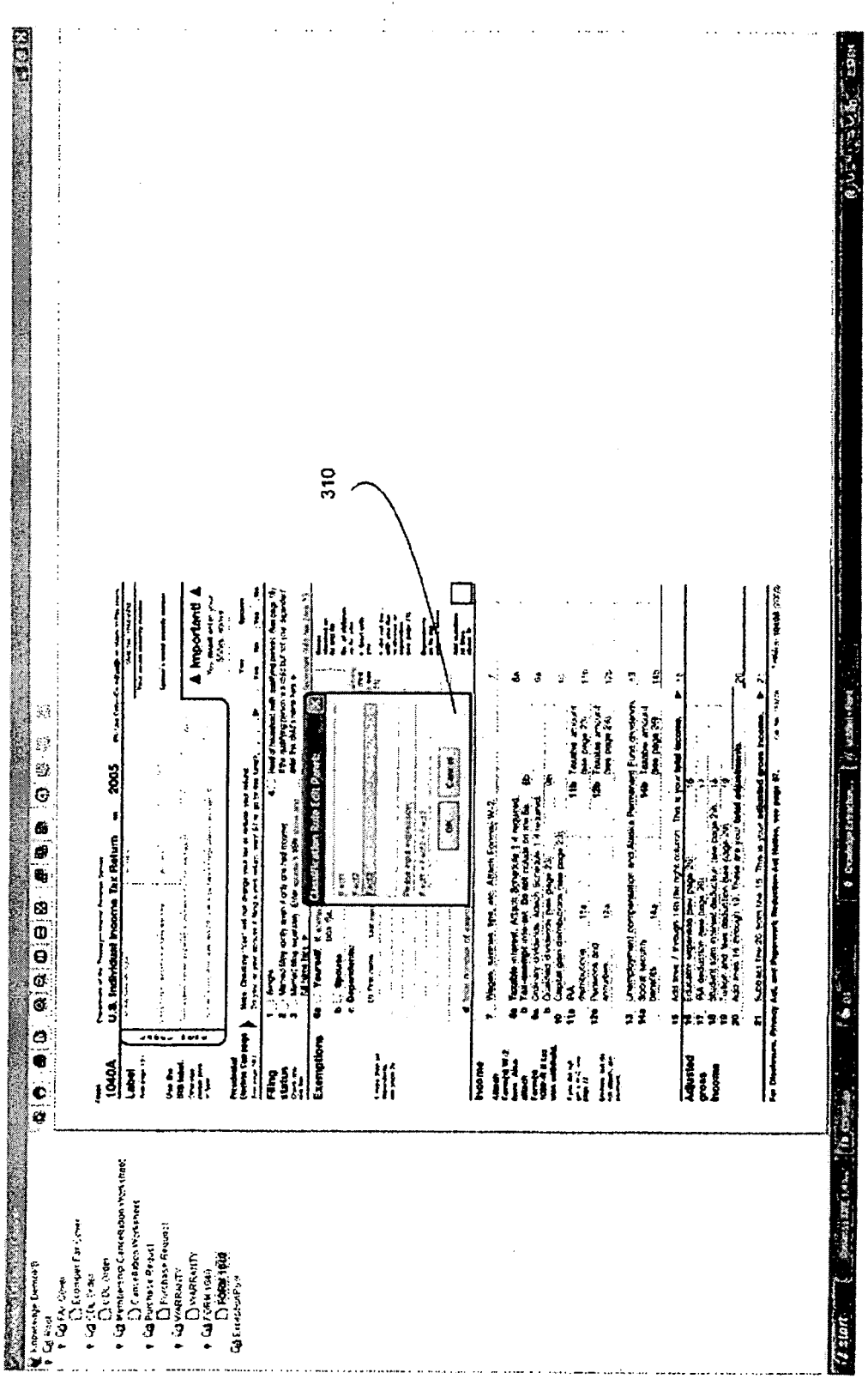
FIG. 3 is an example of Logic Language and Graphics User Interface, with corresponding set up relationships between rules.

Referring now to FIG. 2, an example of the logic language and graphics user interface (GUI) is presented. As shown, a software GUI permits a user to set up rules. In the software, image 240 is a document image, for example, but not by way of limitation, Internal Revenue Service Form 1040, to be used to set up rules for training. This allows the machine to recognize the document automatically. Area 210 lists all the classifications of documents, model images and rules. Areas 221, 222, and 223 are the areas a user may choose as local areas to set up rules for characteristics of the Form 1040. Dialog box 230 is the software dialog box for use to set up rules for area 222. Within dialog box 230 are definitions, information, and data about the characteristics of the contents of area 222. The software is designed to collect the geographical information and data automatically for area 222. After the setup is completed for areas 221, 222, and 223, the system creates Fact 1, Fact 2, and Fact 3. FIG. 3 presents the software that sets up the rule by defining the relationships of these three Facts. The dialog box 310 sets up the AND relationships between the three rules.

Referring again to FIG. 1, expert systems, like expert system 20, differ from conventional programming languages, such as FORTRAN and C, which are designed and optimized for the procedural manipulation of data, such as numbers and arrays. As may be appreciated, humans solve complex problems using very abstract, symbolic approaches that are not well suited for implementation in conventional languages. Although abstract information can be modeled in these languages, considerable programming effort is required to transform the information to a format usable with procedural programming paradigms.

One of the results of research in the area of artificial intelligence has been the development of techniques that allow the modeling of information at higher levels of abstraction. These techniques are embodied in languages or tools that allow programs to be built that closely resemble human logic in their implementation and are therefore easier to develop and maintain. These programs, which emulate human expertise in well defined problem domains, are called expert systems. Expert system 20 can be any commercial available expert system, such as CLIPS, which is available for down load at http://www.ghg.net/clips/download.html.

Referring still to FIG. 1, the rule visualization management unit 36 organizes and manages knowledge so it can be presented visually. Rule visualization management unit 36 asks rule verification, validation and management unit 18 for knowledge or rules and, in turn, retrieves requested information from knowledge base 32. Rule visualization management unit 36 prepares knowledge or rules for visualization in the logic language and graphics user interface 30.

The reasoning management unit 16 is the central business processing unit in the system. It takes formatted knowledge from rule verification, validation and management unit 18, prepares expert system 20, loads knowledge into expert system 20, and executes expert system 20.

During preparation of an execution of a rule or set of rules, the reasoning management unit 16 asks facts generator 14 to provide a document along with facts and data about a document, then executes expert system 20. Expert system 20 advises reasoning management unit 16 as to what has been found and understood. The reasoning management unit 16 will then send the results concerning the content understanding to the results and reports processing unit 38, where reports are generated. If the document is understood, information, data, and analysis will be sent to other applications for further processing. If the document is not understood, results will be sent to training management unit 28 for either retaining if the document was trained before or training if the document has not been trained.

As may be appreciated, other applications can be automated for use with system 10, including document classification, automated redaction, such as for freedom of information purposes, automated data capturing, data mining, document searching and indexing, etc.

Electronic file management unit 23 imports outside electronic files into system 10. Files contemplated for use with system 10 include email, images, such as those in TIFF and PDF format, pictures, such as those in JPEG and BMP format, word processor files, etc. Electronic file management unit 23 can provide functions for electronic document management and file storage management, as those skilled in the art will readily understand.

Facts Generator 14 works under the management of the reasoning management unit 16. Guided by a rule's requirements, facts generator 14 determines the facts, data, and other necessary information about a given file and then provides those to reasoning management unit 16 for document understanding reasoning. The facts, data, and other necessary information are generated through commercially available functions such as pattern extraction, optical character recognition (OCR), intelligent character recognition (ICR), and natural handwriting recognition (NHR). Suitable pattern extraction software is available from MathWorks of Natick, Mass. and is marketed under the trademark MatLab®. Suitable optical character recognition software is available from Nuance Communications, Inc. of Burlington, Mass. and is marketed under the trademark OmniPage®. Suitable intelligent character recognition software is available from Nuance Communications, Inc. of Burlington, Mass. and is marketed under the trademark ScanSoft®. Suitable natural handwriting recognition software is available from Parascript, LLC. of Boulder, Colo. and is marketed under the trademark Parascript® Intelligent Recognition.

In rule-based programming, rules are used to represent heuristics, or "rules of thumb," which specify a set of actions to be performed for a given situation. A rule is composed of an "if" portion and a "then" portion. The "if" portion of a rule is a series of patterns that specify the facts that cause the rule to be applicable. The process of matching facts to patterns is called pattern matching. Expert system 20 provides a mechanism, called an inference engine, which automatically matches facts against patterns and determines which rules are applicable. The "if" portion of a rule can actually be thought of as the "whenever" portion of a rule, since pattern matching always occurs whenever changes are made to facts. The "then" portion of a rule is the set of actions to be executed when the rule is applicable. The actions of applicable rules are executed when the inference engine is instructed to begin execution. The inference engine selects a rule and then the actions of the selected rule are executed, which may affect the list of applicable rules by adding or removing facts. The inference engine then selects another rule and executes its actions. This process continues until no applicable rules remain.

As described in detail hereinabove, in the generation of rules for use in the system disclosed herein, the rule will consists of fact(s) and goal(s) and will have the following format:

IF Fact 1 AND/OR Fact 2 AND/OR [ . . . ], THEN Goal 1 AND/OR Goal 2 AND/OR [ . . . ].

In the context used herein, a fact presents a local characteristic of a document. For example, a fact can relate to an area or entire area of a document file. A fact can be a file fact (i.e., a fact about a given document file), or an area fact (i.e., a fact about an area within a document file).

A file fact, then, is information about a file. It may be defined as, but not limited to, the following information:

| Fields | Type | Example | Description |
|---|---|---|---|
| Name | String | "Letter Size" | |
| Image Width (inch) | Double | 8.5 (inch) | |
| Image Height (inch) | Double | 11 (inch) | |
| Image (Pixel/inch) | Integer | 300 (pixel/inch) | |
| Image Orientation | Enum | 0 | 0: Landscape 1: Portrait; |
| Bits/Pixel | Integer | 1 | Identify the image is b/w, gray scale or color |

An area fact, then, is information about an area within a file. The area can be a portion of a page or the entire page and may be defined as, but not limited to, the following information:

| Fields | Type | Example | Description |
|---|---|---|---|
| Name | String | "Form 1040" | |
| Geographical info | | | Identify a area in a image |
| Top (inch) | Double | 1 (inch) | |
| Left (inch) | Double | 3.2 (inch) | |
| Width (inch) | Double | 2.1 (inch) | |
| Height (inch) | Double | 0.8 (inch) | |
| Fact Identification | | | Describe how to identify this fact |
| ID Type | Enum | 0 | 0: String; 1: Image Pattern; 2: String Pattern |
| ID Value | String/image | | Depend on ID Type |
| Fact Content | | | Define the content of the fact |
| Content Type | Enum | 0 | 0: integer; 1: Double; 2: Date; 3: Time 4: Bool; 5: String; 6: Image Pattern; 7: Statistics |
| Content Variable | Enum | Word | |
| Content | String | % of word | |

| Fields | Type | Example | Description |
|---|---|---|---|
| Description | | "medical" | |
| Content Value | Pointer | Pointer to % | |
| Content Condition | | Word = "medical" | Depend on Content Type and Content Variable |

Where a content condition is to specify fact content and the on of that fact, it can be defined as, but not limited to, the following:

| Content Type | Condition | Description |
|---|---|---|
| Integer | [Minimum, Maximum] | If the value between Minimum and Maximum, condition is satisfied |
| Double | [Minimum, Maximum] | |
| Date | [From, To] | |
| Time | [Start, End] | |
| Bool | [True, False] | |
| String | [String Constant, String Pattern] | |
| Image Pattern | [Pattern] | |
| Format | [Format] | {9d} 9 digital number |
| Statistics | [%] | |

As described above, an expert system, such as expert system 20, executes a larger collection of rules that capture knowledge and is capable of taking intelligent actions. The visualization of rules assists the human expert H to understand rules and to check on rules so that better knowledge capturing occurs. The system disclosed herein groups rules into groups to avoid the complication associated with large numbers of rules which would otherwise make visualization impossible.

As may be appreciated, rules within a group, share some relationship with each other. Four distinct kinds of relationships are identified below:

1. Direct dependency: Rule 2 cannot be executed unless Rule 1 is executed or vice versa. This dependency has two sub-categories: depends on and depended upon;
2. Indirect dependency: Rule 3 cannot be executed unless Rule 2 is executed, which is directly dependant on Rule 1. This dependency has two sub-categories: depends on and depended upon;
3. Circular dependency: Rule 1 depends on Rule 2, which depends on Rule 3, which in turn depends on Rule 1; and
4. Indeterminate dependency: Rule 1 and Rule 2 have dynamic facts and the order of execution between them cannot be determined until the expert system is executed.

Relationships can be presented in the order in which the rule list is traversed. All rules in the group may be shown as nodes. A complete description of each node can be obtained as a label at the node. Therefore, starting from a first rule, relationships of all other rules with respect to this rule can be depicted by labeled arrows. If a rule A depends on execution of rule B, it is shown by an arrow from rule B to rule A. Arrows are labeled as direct, indirect, circular or indeterminate, as the relationship may be.

Representation of relationships between rules in the same group, corresponding to a given rule. When the selected rule is changed, a whole new representation is shown in relation with the newly selected rule. Thus this approach provides a systematic part-by-part view of the complete relationship among the rules in a given group.

Below is an example of an algorithm to partition a rule base into groups:

```
Data structure:
Set R = {r1, r2, r3, ..., rn} //set of rules
Set G = {g1, g2, ...,gn} //set of groups
for each rule in rule-base
        extract fact names from the rule
        for each group in the group set
                search for fact names of this rule
                if at least one fact name matches
                        add rule to this group
                else
                        go to next group
        if fact name not found in any group
                create new group
                add rule to this group
```

For example:

| Rule name | Rule Description |
|---|---|
| Yellow alert | If office closed AND people scarce Then main door is auto-locked AND alert-level yellow |
| Intruder Alert | If alert-level orange AND maintenance crew = none AND server room open Then lock secure rooms AND intruder alert |
| Security swipe card error | If card swiped = true AND person not identified Then alert security office AND log person info |

After extracting fact names from each of the rules, the following table is obtained.

| Rule name | Fact name |
|---|---|
| Yellow alert | Office, people Main door, alert level |
| Intruder alert | Alert level, maintenance crew, server room Lock, intruder |
| Security swipe card error | Card swiped, person Alert, log |

For the first rule, "Yellow alert", there are no groups created yet, hence a new group is created and a first rule placed in that group (group 1). For the second rule, "Intruder alert", a search for fact names is performed in group 1. The fact name alert-level matches, so it is placed in group 1.

For the third rule, "Security swipe card error" does not match the fact names in group 1, so a new group 2 is created and the third rule is placed in that group.

Figure 4:
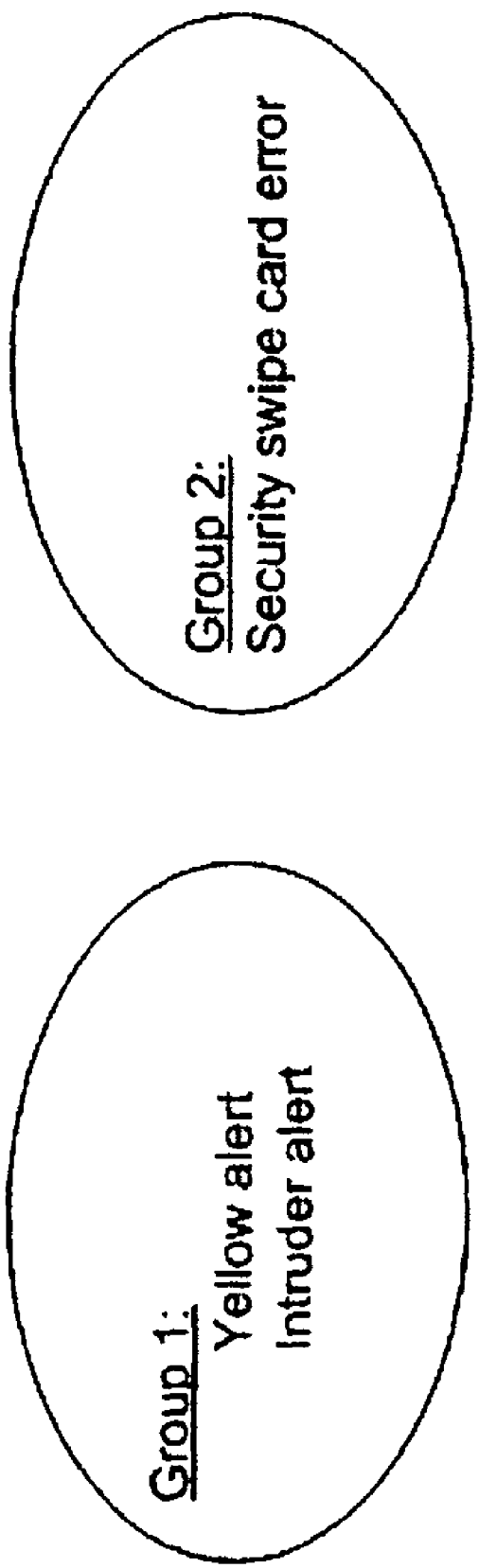
FIG. 4 presents a manner for dividing rules into groups of rules when following an algorithm presented herein for exemplary purposes.

Following the algorithm, rules are divided into groups, as shown in FIG. 4.

Below is an example of an algorithm to determine the relationships between a rule and all the other rules in that group:

A rule can have four different types of relationships with other rules in the group:

1. Direct relationship: Rule 1 depends on Rule 2 or Rule 1 is depended upon by Rule 2;
2. Indirect relationship: Rule 1 depends on Rule 2 or Rule 1 is depended upon by Rule 2;
3. Cyclic relationship; and
4. Indeterminate relationship (i.e., none of the above).

To find the relationship of a Rule I with other rules in its group, we can proceed as follows:

IF-fact names are the fact names in the "if" field of the rule. THEN-fact names are the fact names in the "then" field of the rule.

In the case of a direct dependency relationship, for every Rule I in the group:

```
Data structure:
    Set A = {all the IF-fact names of Rule I}
    Set B = {all the THEN-fact names of Rule I}
    Set A' = {all the IF-fact names of other rules in the group}
    Set B' = {all the THEN-fact names of other rules in the group}
    for every element in Set A
        match with fact names in Set B'
        if match found in rule J
            Rule I directly depends on Rule J
    for every element in Set B
        match with fact names in Set A'
        if match found in rule J
            Rule I is directly depended upon by Rule J
```

In the case of an indirect dependency relationship: construct a dependency graph, with each rule in the group as a node. Add a weight of '1' for directly depends on relationship and a weight of '−1' for directly depended upon by relationship.

For every rule I in the group:

```
Traverse the graph, starting from this rule (i.e. Rule I) following positive weights
    if path exists and distance between Rule I and Rule J is > 1
        Rule I indirectly depends on Rule J
Traverse the graph, starting from this rule (i.e. Rule I) following negative weights
    if path exists and distance between Rule I and Rule J is > 1
        Rule I is indirectly depended upon by Rule J
```

In the case of an indirect dependency relationship:

```
For every Rule I in the group
    for all other rules in the group that Rule I depends on
        if Rule J depends on Rule I (directly or indirectly)
            Rule I is cyclic dependent on Rule J
```

After performing these algorithms for a rule, if there exists a rule in the group that is not related by any of above relationships, then the relationship between these two rules is said to be indeterminate.

Consider the example for previous algorithm with a new rule added:
Red Alert: IF alert-level yellow AND intruder alert THEN alert-level red For the rule "Yellow alert"
Set A, Set B, Set A' and Set B' are defined as follows.

| Rule name | Fact name in if part | Fact name in then part |
|---|---|---|
| Yellow alert | Office, people<br>Set A | Main door, alert level<br>Set B |
| Intruder alert | Alert level, maintenance-crew, server room<br>Set A' | Lock, intruder<br>Set B' |
| Red Alert | Alert level, intruder<br>Set A' | Alert level<br>Set B' |

On executing the algorithm to the above example, we get the following relation:
Rule "Intruder alert" indirectly depends on "Yellow alert"
Rule "Red alert" indirectly depends on "Yellow alert"
For the node A, after graph traversal we obtain the following relationships:

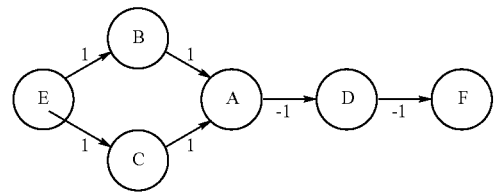

Directly depends on: B, C
Indirectly depends on: E
Is directly depended upon by: D
Is indirectly depended upon by: F All patents, test procedures, and other documents cited herein, including priority documents, are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the invention, including all features which would be treated as equivalents thereof by those skilled in the art to which the invention pertains.

What is claimed is:

1. A computer-implemented, knowledge reasoning process for understanding, in natural language format, at least a portion of the contents of a document, comprising using a computer processor to perform the steps of:
   (a) receiving a document in electronic form, the document stored on a computer readable medium;
   (b) determining and extracting facts and goals, which consist of definitions, information, and data in natural language format, the facts and goals representative of local characteristics and context of the document;
   (c) providing the facts and goals to a computer-implemented reasoning management unit;
   (d) receiving formatted knowledge corresponding to human document understanding in natural language format from a computer-implemented rule verification, validation and management unit;

(e) using the formatted knowledge to prepare a computer-implemented expert system having an inference engine;

(f) reasoning the facts and goals against formatted knowledge using the inference engine of the computer-implemented expert system and determining a set of applicable rules regarding understanding of the content and context of the at least a portion of the document;

(g) providing the computer-implemented reasoning management unit with the applicable rules and information concerning the understanding of at least a portion of the document;

(h) sending a summary of abstract meaning concerning content understanding to a results and reports processing unit; and (i) performing at least one function on the document in electronic form selected from document classification, document sorting, information redaction, information capturing and data extraction wherein the rule verification, validation and management unit performs the following steps:
(1) determining whether conflicting rules exist;
(2) determining whether conflicting facts exist; and
(3) determining whether cyclic data locks, recursive loops and indefinite execution of rules are present.

2. The process of claim 1, wherein the facts and goals are generated using a facts generator using at least one tool selected from the group consisting of a pattern generator, an optical character recognition program, natural handwriting recognition program and an intelligent character recognition program.

3. The process of claim 1, wherein performing steps (a)-(f) does not result in the understanding of at least a portion of the document content and further comprising the step of sending the document to a training management unit.

4. The process of claim 3, further comprising the step of providing an expert with tools and mechanisms to enable the expert to provide information concerning the characteristics of the document type and goals of content understanding.

5. The process of claim 4, wherein the tools and mechanisms are provided through a logic language and graphics user interface.

6. The process of claim 4, further comprising the step of providing the expert with the document from the training management unit and having the expert provide information concerning the characteristics of the document type and goals of content understanding.

7. The process of claim 6, further comprising the step of providing a knowledge generator with the information concerning the characteristics of the document type and goals of content understanding and organizing the information so provided into rules and formatted knowledge.

8. The process of claim 7, further comprising the step of providing the rules and formatted knowledge to the rule verification, validation and management unit for verification and validation.

9. The process of claim 8, further comprising the step of saving the rules and formatted knowledge to a knowledge base.

10. The process of claim 1, wherein the rule verification, validation and management unit performs the following steps:
(iv) sorting rules into groups and managing the groups so arranged;
(v) managing the knowledge base; and
(vi) assembling the rules into a format useful for the expert system.

11. The process of claim 10, further comprising the step of providing the formatted rules to the reasoning management unit.

12. The process of claim 11, further comprising the step of providing the formatted rules to the expert system for execution.

13. A computer-implemented, knowledge reasoning system for understanding, in natural language format, at least a portion of the contents of a document, comprising:

(a) a computer processor for implementing the knowledge reasoning system;

(b) an electronic file management unit for providing a document in electronic form, the document stored on a computer readable medium;

(c) a facts generator for determining and extracting facts and goals, which consist of definitions, information, and data in natural language format, the facts and goals representative of local characteristics and context of the document;

(d) a reasoning management unit for receiving the facts and goals from said facts generator;

(e) a rule verification, validation and management unit for providing formatted knowledge;

(f) an expert system having an inference engine for reasoning the facts and goals against the formatted knowledge using said inference engine and determining a set of applicable rules regarding understanding of the content and context of the at least a portion of the document, said expert system implemented by said computer processor, and (g) a report processing unit for receiving a summary of abstract meaning concerning content understanding wherein said rule verification, validation and management unit determines whether conflicting rules exist; determines whether conflicting facts exist; and determines whether cyclic data locks, recursive loops and indefinite execution of rules are present.

14. The system of claim 13, wherein the set of facts, data and information is generating through the use of at least one tool selected from the group consisting of a pattern generator, an optical character recognition program, natural handwriting recognition program and an intelligent character recognition program.

15. The system of claim 13, further comprising a training management unit for receiving the document in a case where said reasoning management unit is not initially provided with information concerning the understanding of at least a portion of the document content.

16. The system of claim 15, further comprising tools and mechanisms to enable an expert to provide information concerning characteristics of the document type and goals of content understanding.

17. The system of claim 16, wherein said tools and mechanisms are provided through a logic language and graphics user interface.

18. The system of claim 16, wherein the expert is provided with the document from said training management unit and the expert provides information concerning the characteristics of the document type and goals of content understanding.

19. The system of claim 18, further comprising a knowledge generator for receiving information concerning the characteristics of the document type and goals of content understanding and organizing the information so provided into rules and formatted knowledge.

20. The system of claim 19, wherein said verification, validation and management unit verifies, validates and receives rules and formatted knowledge.

21. The system of claim 20, further comprising a knowledge base for saving the rules and formatted knowledge.

22. The system of claim 13, wherein said rule verification, validation and management unit sorts rules into groups and managing the groups so arranged; manages said knowledge base; and assembles the rules into a format useful for said expert system.

23. The system of claim 22, wherein the formatted rules are provided to said reasoning management unit.

24. The system of claim 23, wherein formatted rules are provided to said expert system for execution.

* * * * *